(12) United States Patent
Kraxner et al.

(10) Patent No.: US 7,351,175 B2
(45) Date of Patent: Apr. 1, 2008

(54) DRIVE TRAIN FOR A MOTOR VEHICLE

(75) Inventors: Dieter Kraxner, Wurmberg (DE); Thomas Busold, Fulda (DE); Wolfgang Grosspietsch, Schweinfurt (DE); Eduard Steiner, Wuerzburg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 69 days.

(21) Appl. No.: 10/482,108

(22) PCT Filed: Oct. 23, 2002

(86) PCT No.: PCT/EP02/11824

§ 371 (c)(1),
(2), (4) Date: Dec. 24, 2003

(87) PCT Pub. No.: WO03/040580

PCT Pub. Date: May 15, 2003

(65) Prior Publication Data

US 2004/0178041 A1    Sep. 16, 2004

(30) Foreign Application Priority Data

Nov. 9, 2001   (DE) ............................ 101 55 050

(51) Int. Cl.
*F16H 31/00*    (2006.01)

(52) U.S. Cl. .................. 475/127; 475/129; 475/130; 475/131

(58) Field of Classification Search ................ 475/116, 475/127, 129, 130, 131; 192/3.51, 3.57
See application file for complete search history.

(56) References Cited

U.S. PATENT DOCUMENTS

| 3,463,283 | A |   | 8/1969 | Stow |
| 4,033,201 | A | * | 7/1977 | Sakai ........................ 477/61 |
| 4,347,765 | A | * | 9/1982 | Leonard et al. ............. 477/150 |
| 5,105,922 | A | * | 4/1992 | Yant ......................... 192/3.58 |
| 5,216,606 | A | * | 6/1993 | Lentz et al. ................. 701/66 |
| 6,116,391 | A | * | 9/2000 | Kremmling et al. ....... 192/3.58 |
| 6,523,657 | B1 | * | 2/2003 | Kundermann et al. ..... 192/48.8 |

FOREIGN PATENT DOCUMENTS

| EP | 0 421 141 |   | 4/1991 |
| FR | 1 523 581 |   | 5/1968 |
| WO | WO 00/02720 | * | 1/2000 |

* cited by examiner

*Primary Examiner*—Ha D. Ho
(74) *Attorney, Agent, or Firm*—Crowell & Moring LLP

(57) ABSTRACT

A drive train for a motor vehicle includes a coupling device between a drive unit and a transmission for torque or moment transfer between the drive unit and the transmission. The coupling device has at least one coupling arrangement that can be activated by a pressure medium. The transmission can be activated through the use of a pressure medium by way of a dedicated actuator whereby, on the basis of a shared pump arrangement that is or can be driven by the drive unit, (i) the pressure medium can be provided for activation of the coupling arrangement, (ii) the operating medium can be conducted to the coupling device for the purpose of operating under the influence of the operating medium, and (iii) the pressure medium can be provided for activation of the transmission. The pump arrangement includes at least one pump, which can be controlled or adjusted with regard to output pressure and/or with regard to output flow rate.

7 Claims, 2 Drawing Sheets

DRIVE TRAIN FOR A MOTOR VEHICLE

BACKGROUND OF THE INVENTION

The present invention concerns a drive train for a motor vehicle, which includes a coupling device between a drive unit and a transmission, in which the coupling device has at least one coupling arrangement which can be activated by a pressure medium, and in which coupling arrangement, the pressure medium is provided by a pump arrangement.

Coupling systems are described, for example, in DE 100 56 954 A1 and DE 101 02 874 A1, and reference to the disclosed content thereof is expressly made in the description of the invention which appears below.

The coupling system is especially configured as a wet clutch double coupling system with two multiple disk clutch coupling arrangements, which can be activated in a hydraulic manner by slave cylinders integrated into the coupling device. Double coupling systems of this type are described, for example, in DE 100 04 179 A1.

Wet clutch double coupling systems, for the activation of the multiple disk clutch couplings, require a low flow rate of the pressure medium under high pressure. For cooling the friction pads and/or disks, they require a comparatively high flow rate of the operating medium, under comparatively low pressure. By comparison with conventional solutions that include a pump that is mechanically driven by the drive unit and that constantly provides a flow rate or output pressure corresponding to the rotational frequency of the drive unit at any given moment, the technique of using an independently adjusted pump arrangement for each flow rate is known, for example, in the aforementioned DE 100 56 954 A1 and DE 101 02 874 A1 documents.

In the case of pumps that are driven by an electrical motor, however, it has been shown that, with drive units characterized by especially high performance ratings and/or especially high rotational frequencies, the requirement of the coupling device for cooling oil can be so high that the use of an electrical motor to drive an electrical motor pump to cool the coupling device becomes inconvenient, as a result of the excessively large amount of room required for a pump of the desired performance rating. For energy-related reasons, however, returning to the conventional solution, which involves a pump that is permanently driven by the drive unit, cannot be envisioned. It is known from prior art that, even in the case of a pump that is permanently driven by the drive unit, it is possible to provide a way of controlling and/or adjusting the output pressure and/or the output flow rate of the pump, without requiring too great a degree of mechanical and control-related effort and expense.

SUMMARY OF THE INVENTION

The present invention is based on the recognition that, with a transmission that can be hydraulically activated in order to save the need for a special pump dedicated to the transmission activation, it is also advantageous to provide the pressure medium for the activation of the transmission with the pump arrangement that is in charge of activating the coupling arrangement and of providing the operating medium for cooling the coupling. Admittedly, as a general rule, a significantly higher level of hydraulic pressure is required for the hydraulic activation of a transmission, especially an automatic transmission, than for the activation of the coupling.

It has, however, been shown that, on the basis of the present invention, it is possible to implement, at comparatively low cost, for an extremely wide range of vehicles, especially those characterized by especially high performance ratings and/or especially high rotational frequencies, three different flow rates, which are required for the operation of a hydraulic wet clutch coupling system and a hydraulic transmission. These three flow rates specifically include: a high pressure at a relatively low flow rate, for activation of the coupling arrangement; a high pressure, or a very high pressure at a relatively low flow rate, for activation of the transmission; and a low pressure, at a relatively high flow rate, for cooling the coupling arrangement.

The controllable and/or adjustable pump can preferably be controlled or adjusted through the use of a pressure medium with a dedicated actuator, whereby the pressure medium for the control and/or regulation of the pump can preferably be provided on the basis of the pump arrangement and/or the pump itself.

A control circuit can preferably be provided for adjusting the output pressure and/or the output flow rate of the shared pump arrangement as a function of need, in order to reduce the energy consumption required by the pump arrangement. It is also contemplated to control the output pressure and/or the output flow rate as a function of need.

It is advantageously possible to provide a first pressure accumulator arrangement which is allocated to the activation of the coupling, and a second pressure accumulator arrangement which is allocated to the activation of the transmission, within a hydraulic system which is allocated to the drive train. As a further development in this connection, the first pressure accumulator arrangement can be filled by means of the pump arrangement in a first condition of the hydraulic system, in a second condition of the hydraulic system, the second pressure accumulator arrangement can be filled by the pump arrangement, and in a further condition of a hydraulic system, the operating medium can be conducted to the coupling device at a maximal flow rate.

With regard to the controllable and/or adjustable pump, various types of pumps are contemplated—for example, an adjustable-eccentricity vane pump, or also adjustable axial or radial piston pumps.

BRIEF DESCRIPTION OF THE DRAWINGS

These and other objects, features and advantages of the present invention will become more apparent from the following detailed description of currently preferred configurations thereof when taken in conjunction with the accompanying drawings wherein.

DETAILED DESCRIPTION OF THE DRAWINGS

Figure 1:
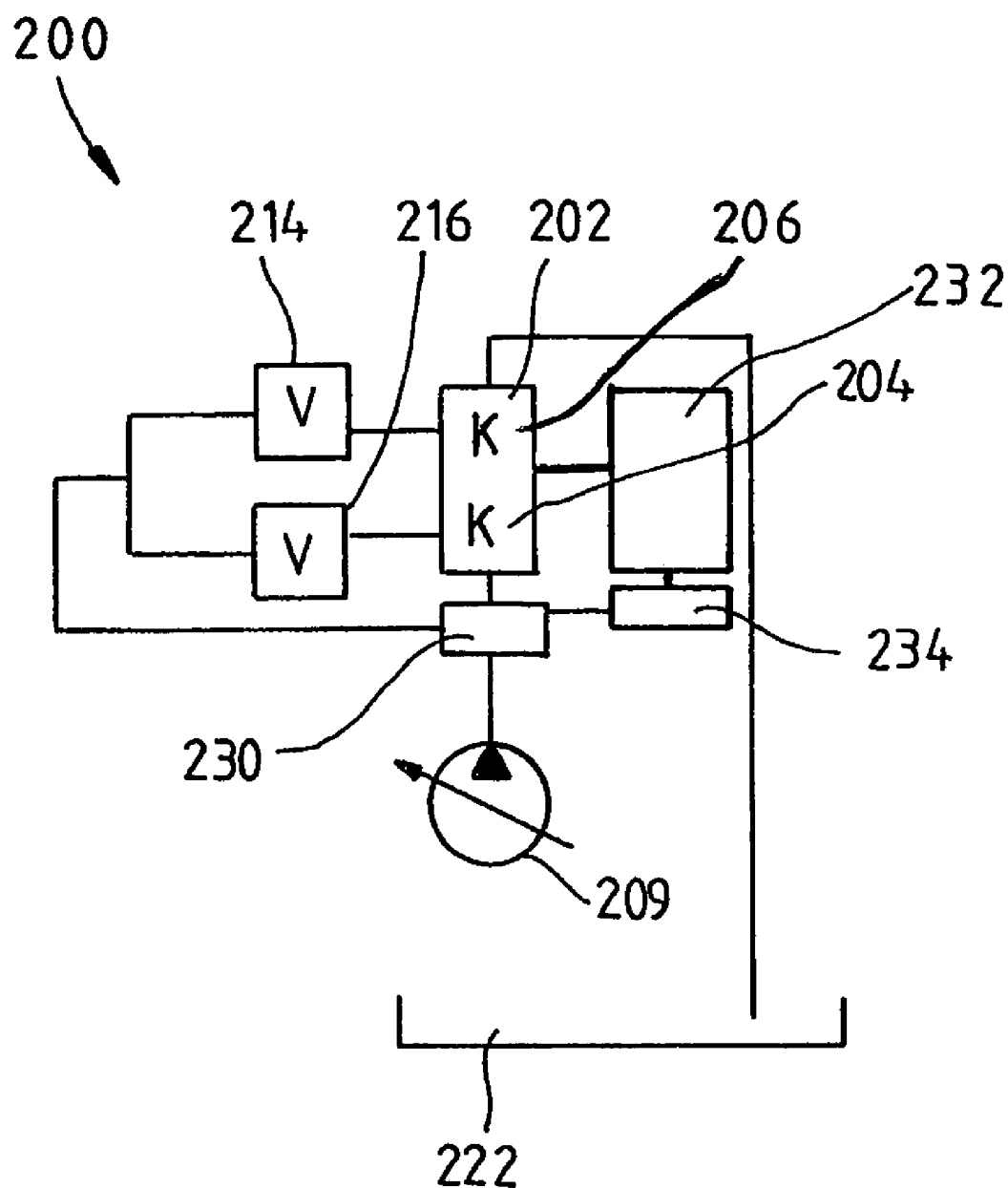
FIG. 1 is an exemplary schematic representation of a basic structure of a coupling system according to the invention, with a wet clutch double coupling, whereby the transmission which is part of a vehicle drive train to which the coupling system belongs also appears in schematic representation.

FIG. 1 shows a coupling system designated generally by the numeral 200, which has a wet clutch double coupling 202 with a first, radially outer coupling arrangement 206 and a second, radially inner coupling arrangement 204. Coupling arrangements 204, 206 are wet clutch coupling arrangements—for example, wet clutch multiple disk clutch coupling arrangements—each of which, in a manner known from prior art, has at least one set of disks, which, in the present design, are radially arranged one on top of the other, and each of which is activated by a dedicated activation piston of a hydraulic slave cylinder integrated into the double coupling. Examples of such double couplings are set forth in DE 100 04 179 A1.

The coupling system 200 has a pump 209, which is mechanically driven by the drive unit such as a combustion engine of the drive chain. Preferably, the pump 209 is a hydrostatic pump or an extruder pump. The pump 209, which can be controlled and/or adjusted independently of the rotational frequency of the drive unit at any given moment, provides, by way of a distribution arrangement 230, a pressure medium, especially pressure oil, at a relatively high pressure, which is sufficient for the activation of the coupling arrangements 204, 206 of the double coupling 202. For the alternative activation of the coupling arrangement, each of the coupling arrangements—or, more precisely, each of their hydraulic slave cylinders—is connected by a dedicated valve 214, 216, respectively, to the distribution arrangement 230 and thereby to the pump 209. The pump draws in pressure medium from a reservoir 222.

In addition, the pump provides, by way of the distribution arrangement 230, a relatively high flow rate of a cooling medium, especially cooling oil, at a relatively lower pressure level. The cooling medium serves to cool the coupling arrangements 204, 206. In addition, the pump 209 provides, via the distribution arrangement 230, a pressure medium, especially pressure oil, at a relatively high or very high pressure level, which is sufficient for the activation of the transmission 232 of the drive train with a dedicated actuator 234. The transmission is preferably a double coupling transmission or a power shift transmission, which can be activated in an automated manner with a known type of control unit (not shown). The transmission has a first transmission input shaft which is dedicated to the first coupling arrangement 206 and a second transmission input shaft which is dedicated to the second coupling arrangement 204. The input shafts are preferably arranged coaxially to each other, with one transmission input shaft running through the other.

Figure 2:
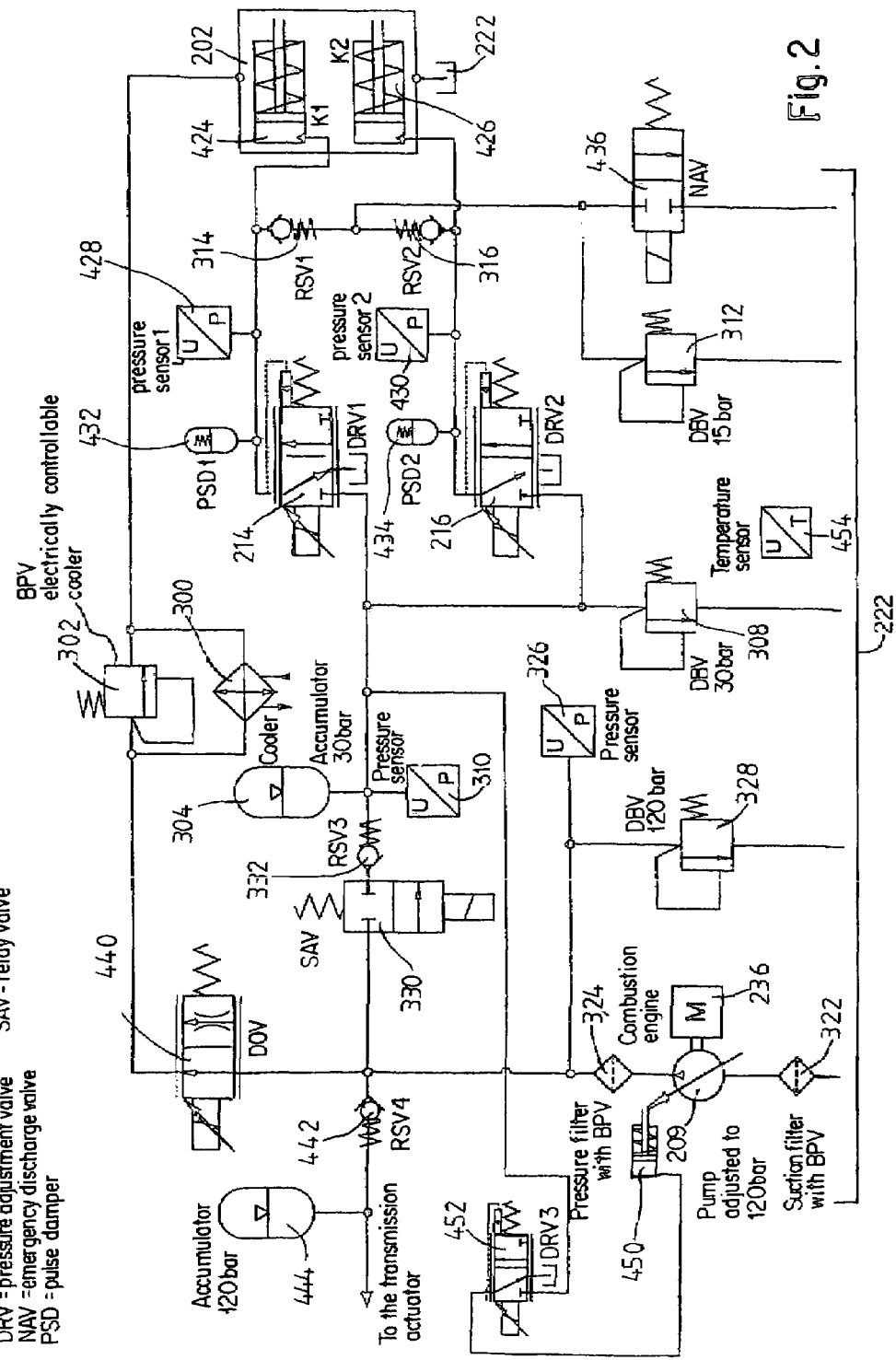
FIG. 2 is a more concrete illustration of a coupling system according to the present invention according to the basic structure as shown in FIG. 1.

FIG. 2 shows, in greater detail, an embodiment of a coupling system which incorporates the basic structure shown in FIG. 1. The cooling oil of the double coupling 202 (each of the two coupling arrangements 204, 206, is represented in FIG. 2 by its own hydraulic slave cylinder, 424, 426 respectively) is conducted by a heat exchanger 300, because, for example, in the case of a prolonged slippage operation, the temperature of the oil in the oil sump 222 can increase markedly. By way of the heat exchanger 300, the oil temperature is kept at a level which is sufficient to cool the double coupling. The cooling oil can become extremely viscous at lower temperatures and, on the basis of the flow resistance of the heat exchanger 300, it could happen that, at especially low temperatures, not enough cooling oil would reach the double coupling and/or too high an oil pressure could result in damage. Therefore, a bypass valve 302, which can, for example, be electrically controllable or, as an alternative, is spring-loaded, is provided to open or shift into an opening position when the oil pressure downstream of the oil cooler 300 exceeds a predetermined pressure threshold, thereby letting the cooling oil in the oil cooler 300 through to the double coupling.

The pump 209, which is operated by the combustion engine 236 of the drive train, and which, for example, is configured so as to provide an output pressure of up to 120 bar, draws the oil from the reservoir 222 via a suction filter 322. Connected to the pump, on the output side, is another filter, known as a pressure filter 324, which is similarly provided with a bypass valve. A pressure sensor 326 serves to monitor the output pressure and, for the sake of safety, is provided with a pressure limit valve 328 which, in the event that the pressure rises higher than, for example, 120 bar, opens and discharges pressure oil into the reservoir 222.

A coupling activation-pressure oil circuit is connected, by a relay valve 330, to the output side of the pump 209. The relay valve 330 is in turn connected to a clapper valve 332. Built into the coupling activation-pressure oil circuit is a pressure accumulator 304 which is kept under pressure and which has a gas cushion. The pressure accumulator 304 is configured, for example, for a maximum pressure of 30 bar. The pressure accumulator 304 ensures a uniform pressure level and bridges the times in which the connection exists between the coupling activation-pressure oil circuit and the pump 209 by the relay valve 330.

Each of the activation slave cylinders of the two coupling devices 204, 206 is connected to the pressure accumulator 304 by way of its own control/adjustment valve 214, 216, respectively. The pressure oil circuit between the clapper valve 332 and the valves 214, 216 is secured, via the pressure limit valve 308, against excessive pressure of the pressure oil which might lead to damage. The pressure limit valve 308 opens, for example, when a pressure of 30 bar is reached. The pressure determined in this pressure oil circuit by the fullness of the accumulator 304 is recorded by a pressure sensor 310.

An additional pressure limit valve 312 ensures that the pressure from valves 214, 216, which operates on the hydraulic slave cylinders of the coupling devices, does not exceed a maximum value in order to avoid, for example, damage. Two clapper valves 314, 316 ensure that a single pressure limit valve is sufficient to monitor the activation pressure of both hydraulic slave cylinders and to protect the slave cylinders against overpressure.

The valves 214, 216 are preferably configured as pressure control/adjustment valves, and adjust and/or control the pressure in the slave cylinders 424, 426 that are allocated to both of the coupling arrangements of the double coupling 202. In the illustrated embodiment, adjustment of the activation pressure of these slave cylinders takes place. For this purpose, the output side of each of the valves 214, 216 is provided with a pressure sensor 428, 430, respectively. Pulse dampers 432, 434 prevent pressure peaks, thus enabling a reliable adjustment of the nominal pressure.

If we assume that the coupling arrangements are of the NORMALLY OPEN type, it will be advantageous to provide an emergency discharge valve 436 which, when triggered, allows pressure oil to flow into the reservoir 222. By allowing the discharge of pressure oil, the emergency discharge valve enables an emergency opening (or a fast opening) of whichever coupling arrangement is stressed in the direction of its engagement.

The cooling oil circuit, which is intended to supply the coupling arrangements with cooling oil, is connected to the output side of the pump 209 by way of an electrically switchable flow control valve 440. In a first switching position, the flow of cooling oil, basically unchecked, is let through the valve 440, by way of the cooler 300 and/or the bypass 302, to the coupling device 202. In a second switching position of the valve 440, a throttle of the valve is activated, so as to let through only a rather low minimum flow rate of cooling oil to the coupling device and thereby to enable an increase of the oil pressure in the area between the pump 209, the valve 440 and the relay valve 330. In this way, when the relay valve 330 is open, the pressure accumulator 304 can be filled by way of the clapper valve 332. If the nominal pressure (maximum filling of the pressure accumulator 304) is reached (this can be determined, by way of the pressure sensor, by a dedicated electronic control unit), the relay valve 330 closes again, and, when necessary, the setting of the valve 440 changes from the throttle setting to the position which again allows the oil to flow through basically unchecked.

As seen in FIG. 2, an additional pressure accumulator 444 is connected to the pump 209 by way of a check valve 442. This pressure accumulator 444, which is configured for a higher pressure than the accumulator 304 (for example, for a maximum pressure of 120 bar) serves to provide an actuator, which is dedicated to the transmission of the drive train, with pressure medium, as shown in FIG. 1. This pressure accumulator 444, in a manner similar to pressure accumulator 304, can be filled in phases with less need of cooling. To this end, the valve 440 is brought into the throttle position and the relay valve is left closed. If the pump is then operated at full power, an increase in pressure takes place between the valve 440, the relay valve 330 and the transmission actuator until pressure values are reached which are sufficient to fill the accumulator 444. As a general rule, simultaneous filling of accumulators 304, 444 is not possible because the maximum pressure of the accumulator 304 is not sufficient to enable the filling of the accumulator 444 which is configured for higher pressure values.

As set forth above, the output flow rate and/or the output pressure of the pump can be regulated (i.e., controlled and/or adjusted). Preferably, the pump is integrated into a control chain or, advantageously, a control circuit in order to control or adjust the output flow rate and/or the output pressure as a function of need. In principle, the regulation of the pump can take place in any desired way such as, for example, with an electromechanical device (an electrical motor or the like). It is preferable for the regulation of the pump to take place, however, by a pressure medium. This is provided in the embodiment of FIG. 2. A hydraulic slave cylinder 450 is connected, by a control/adjustment valve 452, to the pressure accumulator 304. Through suitable control of the valve 452 with a dedicated control unit, the pump can be regulated as a function of need, and including on the basis of characteristic diagrams. It is also contemplated to adjust the pump on the basis of the output pressure recorded by the pressure sensor 326, relative to a predetermined nominal pressure value, which, in turn, could depend on the operational status.

Advantageously, a single control unit would be used to activate and/or control the various valves. The control unit would receive measurement signals from the various sensors, for example, also from at least one temperature sensor 454 which records the temperature of the oil in the reservoir 222.

Another significant aspect of the embodiment of FIG. 2 is that only one pump which is driven by a combustion engine, i.e., the pump 209, is provided in order to handle the flow rate and pressure requirements. The pressure accumulator 304, which is provided in the coupling activation circuit, and the pressure accumulator 444, which is provided in the transmission activating circuit, ensure that the pump does not need to constantly provide the high supply volume at high pressure, because the accumulators are filled during the times when there is no need or only a slight need, for cooling oil. To this end, as set forth above, valves 440, 330 are switched such that the oil supplied by the pump 209 will "pile up" to a certain extent, thus raising the pressure to the point where accumulators 304 and/or 444 can be filled.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

The invention claimed is:

1. Drive train for a motor vehicle, comprising a coupling device operatively arranged between a drive unit and a transmission and being a unit separate from and coupled to the transmission for torque transfer between the drive unit and the transmission, the coupling device having at least one coupling arrangement configured to be activated by a pressure medium, for operation under the influence of an operating medium, and the transmission being configured to be activated by the pressure medium via a dedicated actuator, whereby, with a shared pump arrangement having at least one pump, which is independently regulatable with regard to at least one of output pressure and output flow rate that is drivable by the drive unit so as to develop a desired pressure based only on the regulation of the at least one pump, (i) the pressure medium is providable for activation of the coupling arrangement, (ii) the operating medium is conductible to the coupling device for operating under the influence of the operating medium, and (iii) the pressure medium is providable for activation of the transmission, wherein a first pressure accumulator arrangement is allocated to the activation of the coupling device, and a second pressure accumulator arrangement is allocated to the activation of the transmission with both pressure accumulator arrangements being provided within a hydraulic system and the coupling arrangement comprises a wet clutch coupling arrangement, the wet clutch operation of which takes place under the influence of the operating medium, and the operating medium is an operating fluid.

2. Drive train according to claim 1, wherein the at least one pump is regulatable by way of a second dedicated actuator using the pressure medium.

3. Drive train according to claim 1, wherein the drive train includes a control circuit configured to adjust at least one of the output pressure and the output flow rate of the pump arrangement as a function of need.

4. Drive train according to claim 1, wherein the coupling device is configured as a multiple coupling device, and has a first coupling arrangement, to which at least one first slave cylinder is dedicated, and a second coupling arrangement, to which at least one second slave cylinder is dedicated, whereby the pressure medium provided by the pump arrangement is conductible to both of the slave cylinders independently of each other.

5. Drive train according to claim 3, wherein the at least one pump is regulatable by way of a second dedicated actuator using the pressure medium.

6. Drive train according to claim 1, wherein the operating fluid is a cooling fluid.

7. Drive train according to claim 1, wherein the coupling device is a twin coupling device.

* * * * *